United States Patent Office 3,667,835
Patented June 6, 1972

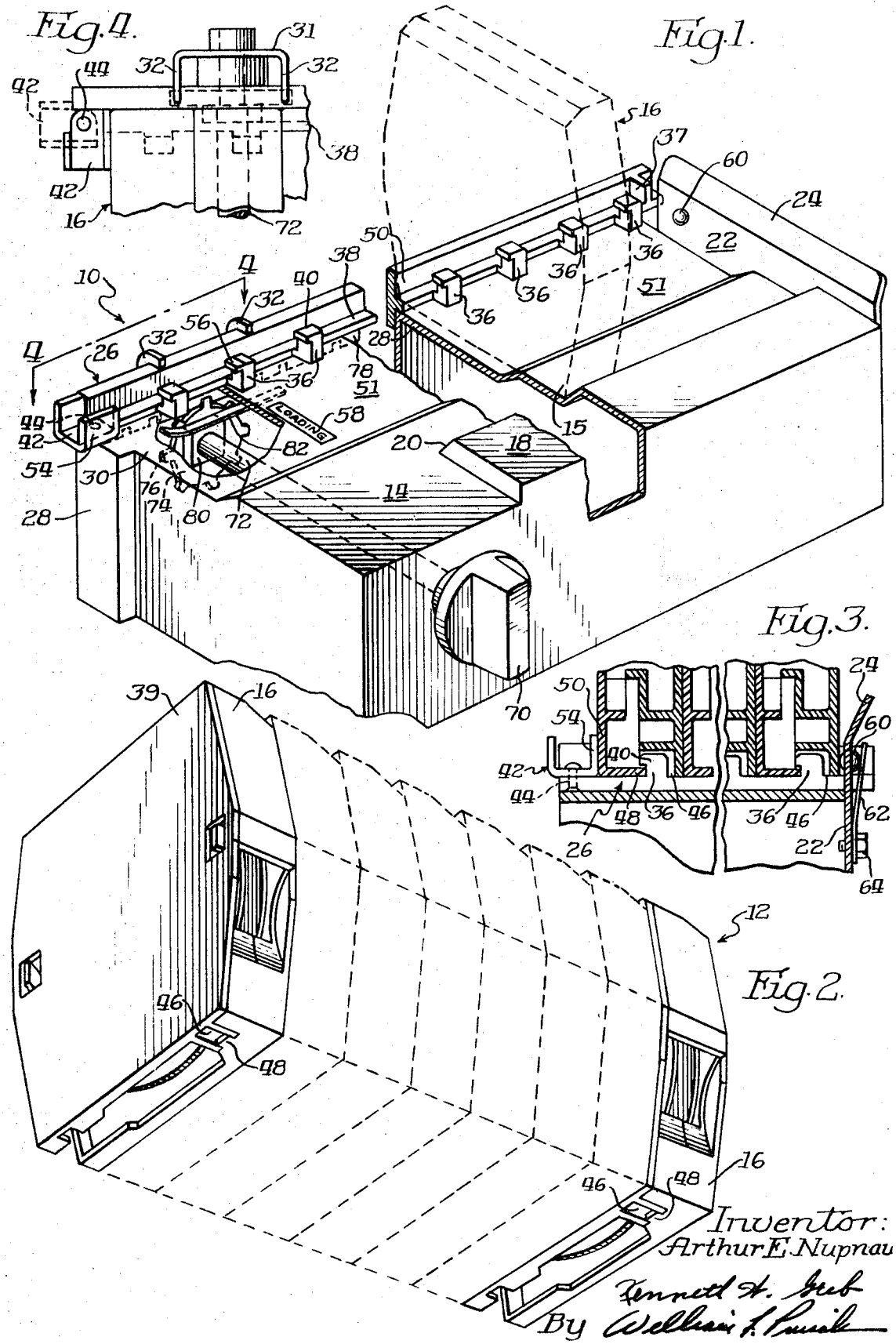

3,667,835
FILM CARTRIDGE ATTACHING APPARATUS
Arthur E. Nupnau, Chicago, Ill., assignor to Bell &
Howell Company, Chicago, Ill.
Filed Apr. 15, 1970, Ser. No. 28,829
Int. Cl. G03b 21/04
U.S. Cl. 352—72          8 Claims

ABSTRACT OF THE DISCLOSURE

An apparatus for selectively attaching one or a group of film cartridges to a motion picture projector for moving one or more cartridges relative thereto. The apparatus includes an attaching member movably supported on the projector and having a plurality of hooks, one for each cartridge, positionable over a ledge in a cartridge, and a manually operable lever for moving the cartridge or cartridges into engagement with each hook.

---

The present invention relates to a motion picture projector and more particularly to an apparatus for selectively attaching a single film cartridge or a group of film cartridges to the projector for moving one or more cartridges relative to a projection station.

The purpose of attaching a group of film cartridges to a projector is to provide a way of conveniently projecting sequentially several 50 foot reels of film without requiring that the reels of film be spliced together to form a continuous reel.

A known system of selectively attaching a group of reels of film to a projector includes the use of a unitary magazine for holding one or more reels of film or one or more film cartridges.

Although this known system serves its intended purpose and function well, it has certain disadvantages. The magazine is a fixed capacity system designed to hold a specific number of reels of film, one of which hold, for example eight reels of film. When it is desirable to show a specific sequence of reels of film less than the capacity of the magazine, the unused space in the magazine then adds undesirable bulkiness to the projector when in use and results in wasted space when in storage. If reels of film of another sequence are inserted in the unused space, the operator would have to be particularly careful when using that magazine to avoid showing any portion of the second sequence and the cartridge would have to be carefully marked.

It is an object of this invention to provide a convenient and reliable apparatus for selectively attaching a single film cartridge or a group of film cartridges to the projector without the use of a magazine.

It is another object of this invention to provide an apparatus adapted for conveniently attaching a group of previously stacked film cartridges to a projector. The stacking of film cartridges is made possible by the fact that each cartridge has means for securely attaching it to another cartridge. This cartridge stacking means avoids the necessity of a magazine thereby eliminating bulkiness and providing efficient storage of a varying number of reels of film in a specific sequence.

It is a further object of this invention to provide an apparatus adapted for attaching a group of previously stacked film cartridges to a projector for efficiently moving the stacked cartridges relative to the projector.

These and other objects of the invention will be readily understood by those skilled in the art with reference to the following specification and accompanying figures.

In the drawings:

FIG. 1 is a right front perspective view of the present cartridge attaching apparatus showing one cartridge in an attaching position and showing an abutment lever in an ineffective position;

FIG. 2 is a bottom perspective view of a group of eight stacked and interlocked film cartridges and showing the cartridge defined opening in each end cartridge that cooperates with the cartridge attaching member;

FIG. 3 is a partial right side elevational view in section showing the abutment lever in an effective position and showing a biasing means under maximum tension due to the attachment of a stack of eight cartridges to the projector; and FIG. 4 is a partial top plan view taken along lines 4—4 of FIG. 1 showing the two positions of the manually operable lever.

Referring to FIG. 1, the apparatus 10 is illustrated as a portion of a motion picture projector and is capable of positioning one or more cartridges including a stack 12 (FIG. 2) of eight cartridges on the projector. An upper surface 14 is arranged to support one bottom end 15 of a cartridge 16. A shelf 18 raised above the top surface 14 has an inclined front edge 20 to assist in the alignment of the cartridge on the projector for attaching purposes. An end wall 22 extends upward from the top surface 14 and has an outwardly formed guide portion 24 which cooperates with the front edge 20 to assist in the alignment of the stack 12 of eight cartridges on the projector for attaching purposes.

The attaching member 26 is slidably supported on the upper left hand corner 28 of a frame 30 by a bracket 31 having two guide fingers 32 extending over a guide edge 34. The attaching member 26 has eight fingers 36 integrally projecting upwardly from a horizontally extending support edge 38. Each finger 36 has a hook portion 40 extending horizontally in a direction parallel to the movement of the attaching member 26. The fingers 36 are equally spaced from each other along the attaching member 26. A manually operable abutment lever 42 is pivotally supported on the attaching member 26 by a rivet 44.

Now referring to FIGS. 2 and 3, each cartridge 16 defines an opening 46 of sufficient size to receive the finger 36 and hook portion 40 when a cartridge is placed over the finger 36. Each cartridge also has a ledge 48 adjacent to the opening 46.

To selectively attach one cartridge 16 to the projector, the cartridge must be placed at the extreme left end of the attaching member 26 adjacent the abutment lever 42, as shown in FIG. 3. One bottom end 15 of the cartridge 16 is positioned on the top surface 14 and against the front edge 20. The opposite bottom end 50 of the cartridge 16 is positioned over finger 36 and then rests on support edge 38 of the attaching member 26.

A recessed section 51 of the frame 30 provides a space between the bottom of the cartridge 16 and the frame 30 to preclude the possibility of damage to the free end of the film as the cartridge is moved along the surface 51. Referring to FIG. 3, the abutment lever 42 may be manually pivoted to cause an upstanding abutment 54 to contact the outside wall of the bottom end 50 and thereafter move the cartridge 16 toward the finger 36 until the ledge 48 passes under the hook portion 40 and limits against the finger 36. The abutment 54 is now flush against the cartridge 16 which securely locks the bottom end 50 of the cartridge 16 to the attaching member 26 by clamping the cartridge 16 between the abutment 54 and the finger 36. When the cartridge is attached in this position and when the attaching member 26 is moved relative to the frame 30, the cartridge 16 moves with the attaching member 26 and slides along the top surface 14.

To selectively attach a stack of two or more cartridges to the projector, the end cartridge must be placed at the extreme left end of the attaching member 26 adjacent the abutment lever 42. With the stack of cartridges placed in this position, pivoting the abutment lever 42 moves each cartridge, because they are securely attached to one another, against a respective finger 36 and positions each cartridge ledge 48 under a respective hook portion 40. The end cartridge is clamped between the abutment lever 42 and a finger 36 while each succeeding cartridge is clamped between an adjacent cartridge and a finger 36 thereby selectively attaching a group of previously stacked cartridges.

To remove a single cartridge or a stack of two or more cartridges, the abutment lever 42 is pivoted to its ineffective position, FIG. 1. Then the cartridge or the stack of cartridges is moved laterally in the direction of the abutment lever 42, thereby moving the ledges 48 from under the hook portion 40 of fingers 36. The cartridges are thus freed, and may be lifted from the projector.

A group of eight stacked cartridges, as shown in FIG. 2, are conveniently attached to the projector by first positioning the attaching member 26 in a position where an indicia 56 on one of the fingers 36 is in alignment with a loading mark 58 on the frame 30. The eight stacked cartridges are then placed on the frame 30 by using the guide portion 24 and end wall 22 in combination with the inclined edge 20 of the raised shelf 18. Each cartridge defined opening 46 is thereby positioned over a respective finger 36. The abutment lever 42 is now pivoted to move the cartridges against each respective finger 36. When a full stack of cartridges are so moved, the end cartridge abuts against a back support 37. The back support 37 ensures that a back section 39 of the cartridge 16 cannot be accidently separated from the cartridge.

The movement of the stack against the end wall causes the end cartridge adjacent the end wall 22 to displace a spring-biased ball 60 supported on the end wall 22. The ball 60 is held in an opening in the end wall 22 by the tension of a leaf spring 62 which is fixed to the end wall 22 by any suitable means, such as a screw 64. When the abutment lever 42 is pivoted to its ineffective position, shown by broken lines in FIG. 4, the leaf spring 62 has sufficient tension to move the stack of eight cartridges to the left thereby displacing each cartridge ledge 48 from under each hook portion 40. The stack of eight cartridges may now be freely lifted from the projector.

A drive means for moving the attaching member 26 relative to the frame 30 is shown in FIG. 1. A control knob 70 is suitably fixed to one end of the shaft 72 and a toothed member or gear 74 is suitably fixed to the opposite end of shaft 72. The gear 74 has teeth 76 in mesh with a toothed rack 78 integrally formed in the attaching member 26.

A square shaped detent member 80 is coaxially formed integral with the gear 74. A leaf spring 82 is positioned for engaging any of the sides of the detent member 80 thereby detenting the attaching member 26 in any of its selected positions. The control knob 70 is rotated for alignment of any selected one of the cartridges 16 in a predetermined position for threading of the film carried by the cartridge into the projector.

What is claimed is:

1. An apparatus for attaching a film cartridge to a motion picture projector comprising:
    a member adapted to receive a cartridge, said member movable relative to the projector; and
    means operable to move the cartridge relative to said member for locking the cartridge to said member to move said locked cartridge relative to the projector.

2. The apparatus as defined in claim 1, wherein said operable means includes an abutment operable to move the cartridge relative to said member.

3. The apparatus as defined in claim 1, wherein said operable means is supported on said member, which means is operable to move the cartridge relative to said member for attaching the cartridge to the projector.

4. The apparatus as defined in claim 1, wherein each cartridge has a ledge and an opening adjacent said ledge and said member includes a plurality of hooks, each of said hooks being moved over said ledge of a respective cartridge for attaching a plurality of cartridges to the projector.

5. The apparatus as defined in claim 4, further comprising biasing means for moving said ledge of each of the plurality of cartridges away from said plurality of hooks when said operable means is moved to an ineffective position.

6. The apparatus as defined in claim 1, further comprising drive means for moving said member relative to said frame.

7. The apparatus as defined in claim 6, wherein said drive means includes a toothed rack integrally formed on said member and a toothed member engageable with said toothed rack and operable to move said member relative to said frame.

8. The apparatus as defined in claim 1, wherein said member includes a support edge for supporting one part of the cartridge and wherein said frame includes a top surface for supporting a second part of the cartridge for attaching the cartridge to the projector for movement relative thereto.

References Cited

UNITED STATES PATENTS 3,551,038   12/1970   Bundschuh et al. _____ 352—72
3,550,879   12/1970   Bundschuh et al.

S. CLEMENT SWISHER, Primary Examiner

U.S. Cl. X.R.

352—123